UNITED STATES PATENT OFFICE.

HARRY A. HOFFMAN, OF AKRON, OHIO, ASSIGNOR TO THE B. F. GOODRICH COMPANY, OF NEW YORK, N. Y., A CORPORATION OF NEW YORK.

ART OF COATING GOLF-BALLS.

1,251,029.  Specification of Letters Patent.  Patented Dec. 25, 1917.

Continuation of application Serial No. 876,979, filed December 12, 1914. This application filed July 20, 1916. Serial No. 110,343.

*To all whom it may concern:*

Be it known that I, HARRY A. HOFFMAN, a citizen of the United States, residing at Akron, in the county of Summit and State of Ohio, have invented certain new and useful Improvements in the Art of Coating Golf-Balls, of which the following is a specification.

The object of this invention is to provide a coating for golf-balls which shall be more elastic, adherent and durable, and which may be applied in less time than the paint now commonly used for this purpose.

The ordinary golf-ball paint consists of a white pigment carried in a vehicle composed principally of linseed oil and turpentine, to which a resinous material is usually added. Successive coats are rolled on by hand and each coat has to be dried for about 48 hours, so that the whole operation consumes several days. The paint, as is well known, is relatively inelastic and readily chips or wears off in service, so that the ball soon loses its whiteness and cannot be very easily cleaned.

My improved coating, in the best form of the invention now known to me, is composed of a vulcanizable gum or gums, such as rubber, mixed with a suitable pigment and applied in solution, and then vulcanized with a fluid containing sulfur. By way of example, white Ceylon crape rubber is compounded on a mixing mill with an equal weight of lithopone, oxid of zinc or other white pigment, and the resulting compound is dissolved in benzol or a pure grade of gasolene. In this solution the balls are dipped two or three times, drained, and the coating partially or wholly dried after each dipping. The coating is then cured, preferably by subjecting the coated ball to what is known as the vapor cure, performed by vaporizing a liquid containing sulfur (for example one of the chlorids of sulfur such as the monochlorid, $S_2Cl_2$, or the dichlorid, $SCl_2$) in a chamber in which the balls are suspended in racks. The duration and temperature of the curing operation are important factors in obtaining a satisfactory result. The temperature must be below the point (about 160° F.) at which the golf-ball cover, usually composed of gutta-percha and rubber, begins to soften and lose its shape. On the contrary a relatively-high temperature facilitates the cure by softening the pigmented rubber coating and more thoroughly maintaining the vaporous condition of the vulcanizing agent. Over-curing produces a yellowish tinge. Under-curing leaves the coating too soft. A relatively-quick cure increases the capacity of the apparatus. After much experimenting I have found that a temperature of approximately 130° F. and a duration of approximately 12½ minutes for the vulcanizing operation will yield the best results, although a slight departure in either factor, one way or the other, is permissible. By dropping the temperature, or decreasing the quantity of vapor, or both, the curing period may be very substantially lengthened, but without affording any important compensating advantage. If the pigment employed should impart a yellowish tinge, the coating may be whitened by adding to the solution a small quantity of ultramarine. The successive coats may, if desired, be graduated as to the amount of pigment, from no pigment or only a small amount in the first coat, up to the maximum amount in the last or outer coat, and the amount of pigment in this outer coat may sometimes exceed fifty per cent. of the total weight of its rubber and pigment.

A coating applied according to my invention is far more durable in service and more elastic than paint. It is also more adherent to the cover of gutta-percha or other material on the golf ball by reason of the slight solvent action exerted thereon in the pigmented bath when the ball receives its first dipping. The immersions are quite brief and the entire operation of coating and curing may be performed in a few hours, although I prefer to dip the balls one day and cure them the next, as I find that this improves the gloss. The coating is smooth and easily washed, and retains its whiteness after long-continued use of the ball. The balls show greater resiliency when dropped in a rebound test, than a painted ball, and it is possible to impart a greater spin when desired, owing to the fact that the rubber coating clings to the club face with more friction than paint.

The present application is a continuation of my application Serial No. 876,979, filed December 12, 1914, for the same subject matter.

I claim:

The process of coating golf-balls covered with material of the nature of gutta-percha which consists in coating the ball with a solution of rubber containing a white pigment, drying said coating, and curing the coating for approximately 12½ minutes in a vulcanizing vapor at a temperature of approximately 130° F.

In testimony whereof I have hereunto set my hand this 11 day of July, 1916.

HARRY A. HOFFMAN.